June 18, 1957      J. W. GRAY      2,796,568
CYCLIC FUNCTION MODIFYING CIRCUIT
Filed Nov. 19, 1954
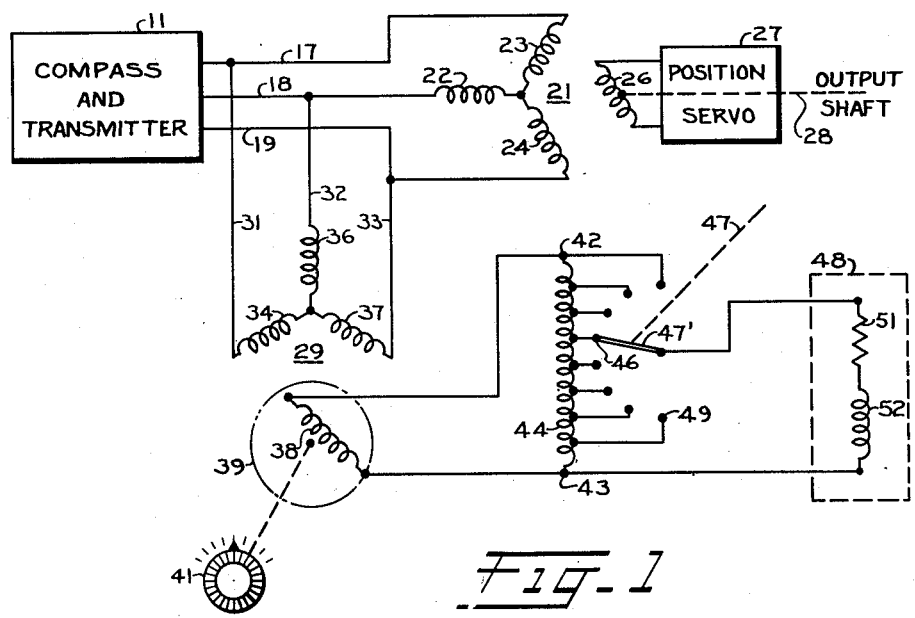
*Fig. 1*
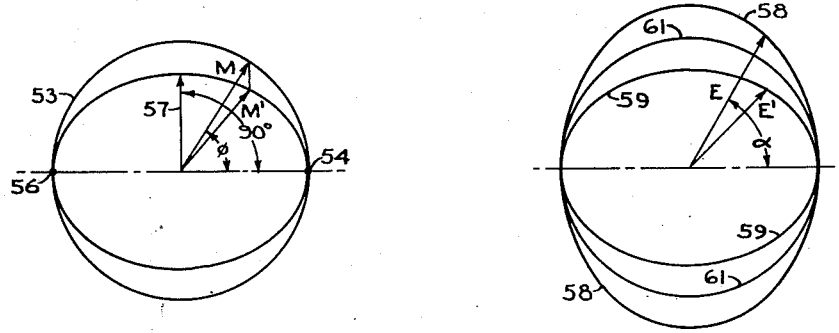
*Fig. 2*      *Fig. 3*
INVENTOR.
JOHN W. GRAY
BY
ATTORNEY.

United States Patent Office 2,796,568
Patented June 18, 1957

2,796,568

CYCLIC FUNCTION MODIFYING CIRCUIT

John W. Gray, Pleasantville, N. Y., assignor to General Precision Laboratory Incorporated, a corporation of New York Application November 19, 1954, Serial No. 470,075

7 Claims. (Cl. 318—39)

This invention relates to an electrical arrangement for adding a second harmonic to any cyclic function and more generally for adding the second harmonic in any desired relative magnitude and in any desired phase relation.

Such an arrangement is of particular use in correcting magnetic compass deviation in those cases where the use of soft iron corrective masses is not practicable. In such cases a second harmonic error in the relation of the compass indication to azimuth angle can be corrected by the means of this invention, the correction being equal to the error in magnitude and opposite in space phase.

In the use of a magnetic compass on a vehicle of any kind, deviation of the indications may be experienced due to the presence of magnetic material on the vehicle. If the magnetic material has low retentivity its magnetism is temporary and is due only to the induction of the earth's field, both the polarity and strength of the magnetization being dependent upon the heading and attitude of the vehicle. The presence of such soft magnetic material near the compass produces an error which varies through two complete and nearly identical cycles as the vehicle's head is turned in azimuth through a complete circle. In this sense the magnetic mass produces a double frequency compass error. That is, the frequency of the error is double the frequency of the azimuth characteristic function. It is this double frequency error which is neutralized by this invention by introducing data of equal intensity and opposite sense or space phase to the electrical system by which the compass data is transmitted from the compass to utilizing or remote indicating equipment.

This invention is useful not only for introducing such compass correction but also for introducing a second harmonic to any cyclic function.

In general, the invention employs a synchro multiphase data generation and transmission system. With it is associated a synchro component which applies a passive impedance load to the synchro generator so as to cause its output voltage to vary in a double frequency manner, the fundamental frequency being that of space rotation of phase in transmission of any function. Provisions are made for adjustment of both the magnitude and space phase of the added second harmonic component, relative to the primary frequency component.

In applying this invention to the neutralization of compass double frequency error, an alternating current compass take-off is employed to apply the compass signal containing a double-frequency error to a synchro polyphase system, the so-called three-phase single-speed system being conveniently employed. This system may employ 400 C. P. S. or 800 C. P. S. alternating current in three synchro transmission circuits having a signal magnitude interrelation referred to as the space phase. The correction is inserted in these three circuits by modifying their signal magnitudes relative to the azimuth angle and the resulting data may be converted to mechanical shaft displacement by use of a control synchro transformer and position servomechanism.

The general purpose of this invention is to introduce into a space phase synchro data transmission signal an electrical component having a frequency which is the second harmonic of the space fundamental frequency.

A particular purpose of this invention is to generate and introduce a neutralizing double space frequency correction signal in a synchro polyphase compass data transmission system in which a double space frequency error exists.

A further purpose of this invention is to apply a synchro control transformer having adjustable impedance and constant resistance-to-reactance ratio in shunt with a synchro transmitter having similar impedance and identical resistance-to-reactance ratio, whereby a second space harmonic voltage component of adjustable magnitude and space phase is added to the output voltage of the synchro transmitter.

A further understanding of this invention may be secured from the detailed description and drawings, in which:

Figure 1 schematically represents a circuit embodying the invention.

Figures 2 and 3 graphically illustrate the operation of the invention.

Referring now to Fig. 1, a magnetic compass of any type, such as for example the flux gate compass or the flux valve compass, is combined with or inherently comprises a suitable take-off device and synchro data transmitter. Such a combination is depicted by the rectangle 11. The synchro data transmitter chosen for illustration is of the so-called three phase type, operating at 800 C. P. S., with three output conductors 17, 18, and 19.

In the three-phase synchro transmission system selected for illustration the input line-to-line impedances and resistance-to-reactance ratio have specific and selected values. The time phases from line-to-line and the three lines 17, 18, and 19 are identical, but the space phases are different, the relation of the magnitudes of the three interline voltages being a function of the physical angle of the synchro transmitter and ideally of the azimuth angle of the compass. That is, the variations of these voltage magnitudes transmitting azimuth data may be termed space phasing, and the difference at any compass azimuth position between the alternating voltage existing on one conductor and that existing on another conductor may be termed their space phase difference.

The synchro signal carried by the three conductors 17, 18, and 19 is received by a conventional synchro control transformer 21 having three primary windings, 22, 23 and 24 connected spatially in a three-phase star arrangement. The secondary winding 26 is connected through a position servomechanism 27 so as to position the control transformer shaft 28 to that null position in which no voltage is generated in the secondary winding 26. As so far described the angular position of the control transformer shaft 28 duplicates the angular position of the compass transmitter shaft and the angular deflections of shaft 28 constitute the output data of the transmission system.

In place of the control transformer 21 and position servo 27 a conventional synchro receiver or repeater may be employed to position a lightly loaded output shaft, omitting the servomechanism 27.

A three-phase synchro control transformer 29 is connected through conductors 31, 32 and 33 to the transmission conductors 17, 18 and 19 so that its impedances as reflected to the line from its primary windings 34, 36 and 37 are respectively in parallel with the impedances of the synchro transmitter 11. The control transformer 29 is of the type having a three-winding field and a single-winding armature, the single winding being indicated at 38. This armature must be of the magnetically smooth or non-salient-pole type, so that, when the winding 38 is open, rotation of the rotor causes no change in the path of the field flux. Although this control transformer is shown as having its secondary winding on the rotor it may of course be of the electrically equivalent type having its secondary winding stationary and its field windings on the rotor.

The smooth rotor carrying secondary winding 38 is indicated by the dashed circle 39, and is adjustable in angular position by means of a shaft, knob and dial indicated at 41. The secondary winding 38 is connected to the terminals 42 and 43 of a tapped autotransformer 44. The secondary winding portion of the autotransformer 44 is that part included between the terminal 43 and any tap 46, tap changing being effected by a tap switch indicated at 47. A selected passive impedance 48 is connected between the terminal 43 and switch arm 46.

This selected impedance 48 closely duplicates in its resistance-to-reactance ratio the output resistance-to-reactance ratio of the synchro transmitter 11, so that the selected impedance, when transformed through autotransformer 44 and again transformed in control transformer 29, applies a selected line-to-line impedance value across the transmission lines 17, 18, 19 having at this point the same resistance-to-reaction ratio as the transmitter line-to-line resistance-to-reactance ratio. The magnitude of the impedance applied through control transformer 29 to the lines 17, 18, 19 depends not only on the magnitude of the impedance load but also on the autotransformer ratio, varying from a low value when the switch arm 47' is connected to the terminal tap 42 to the highest value corresponding to the highest step-up transformation ratio when the switch arm 47' is connected to the distal tap 49.

The passive impedance load is conveniently an inductor having some resistance, and is represented in Fig. 1 by lumped resistance 51 and lumped inductance reactance 52 connected in series.

The presentation of the impedance load to the line conductors in this manner preserves a constant resistance-to-reactance ratio of the load which is that of the impedance 48, while permitting adjustment of the impedance magnitude by means of the tap switch 47 and adjustment of the space phase of the load by means of knob and dial 41.

In describing the operation of this correction circuit, let it be first supposed that the compass device 11 is mounted on a marine vessel or aircraft and that it suffers from no deviation errors, so that the movement of the compass needle and the corresponding signal applied to lines 17, 18 and 19 are in strict linear proportion of azimuth angle as the vehicle's heading is changed. At any selected azimuth angle the several voltages to neutral of the lines 17, 18 and 19 are impressed respectively on the primary windings 34, 36 and 37 so as to set up a resultant magnetic field in the control transformer 29 having a particular direction $\phi$ and magnitude M, the angle $\phi$ representing azimuth angle. If the secondary winding 38 be open the magnitude M will be constant since the rotor is magnetically smooth under these conditions. Fig. 2 illustrates this condition, the circle 53 being the locus of the vector M ($\phi$). Assuming the behavior of the control transformer is that of an ideal transformer, the primary impedances will be infinite and will not load the synchro transmitter.

If now a dissipative load be connected to the secondary winding 38 the impedance of the primary windings applied across the lines is still infinite, or very high, when the azimuth angle is such that the resultant magnetic field is exactly at right angles to the winding 38, for at this angle the winding 38 does not link the field and therefore can draw no energy from it. In Fig. 2, the point 54 represents this condition, at $\phi = 0$. When the resultant field is at 180° the condition is obviously the same, and is represented in Fig. 2 at 56. When the resultant field is at 90° the linkage is maximum and maximum energy is drawn from the magnetic field and dissipated through transformer 44 in resistor 51. The impedance 48 therefore loads the transmitter and is transformed through autotransformer 44 and control transformer 29 to equivalent impedances at the transmission lines 17, 18 and 19. The line voltages are accordingly reduced from their unloaded values because of paralleling of the internal impedances of the synchro transmitter by the impedances applied through control transformer 29. The field magnitude representing these reduced voltages is indicated in Fig. 2 at 57. A similar reduction occurs at 270°. At any other angle $\phi$ an intermediate reduction of the resultant field strength is caused resulting in a magnitude M'.

The vector M' representing resultant field strength of the loaded control transformer 29 and also representing variation of line voltage with azimuth varies sinusoidally during change of azimuth of 360° through two maximums and two minimums, and thus by definition varies as the second harmonic of the cycle function in terms of the variable azimuth.

If, instead of there being a linear relation between compass output and vehicular heading, a two-cycle error such as caused by nearby masses of soft iron exists in the compass output, it may be neutralized by the addition of such a two-cycle correction having the same magnitude and opposite space phase. This is illustrated in Fig. 3 in polar coordinates. The ellipse 58 represents the line voltage E during a change of 360° in azimuth when the compass has two-cycle deviation, the control transformer 29 being absent or open. The ellipse 59 represents the voltage E' which would result from applying the loaded control transformer 29 with a selected load and phase angle to the line when fed by an errorless transmitter, and the circle 61 is the average of the two ellipses in which the addenda of the ellipse 58 are neutralized by the dedenda of the ellipse 59.

What is claimed is:

1. A cyclic function modifying circuit comprising, means for generating a spatially multiphase signal representative of said cyclic function, mechanical means for controlling the space phase of the signal generated by said generating means, a receiving load having said signal imposed thereon, synchro means having a magnetically smooth adjustably rotatable magnetic structure having spatially multiphase input terminals and having output terminals, said input terminals being connected across said generating means, and a passive load connected across said output terminals.

2. A cyclic function modifying circuit comprising means for generating a spatially multiphase signal representative of said cyclic function and presenting at its output terminals a selected resistance-to-reactance ratio, mechanical means for controlling the space phase of the signal generated by said generating means, a receiving circuit connected to said output terminals, synchro means having a magnetically smooth adjustably rotatable magnetic structure, said synchro means having spatially multiphase input terminals and having output terminals, said input terminals being connected to the output terminals of said generating means, and a passive load connected across the output terminals of said synchro means, said passive load having such resistance-to-reactance ratio as to apply through said synchro means an impedance having said selected resistance-to-reactance ratio across said generating means output terminals.

3. A cyclic function modifying circuit comprising, means for generating a spatially multiphase signal representative of said cyclic function and presenting at its output terminals a selected resistance-to-reactance ratio, mechanical means for controlling the space phase of the signal generated by said generating means, a receiving circuit connected to said output terminals, synchro means having a magnetically smooth adjustably rotatable magnetic structure, said synchro means having spatially multiphase input terminals and having load output terminals, said input terminals being connected to the output terminals of said generating means, and an adjustable dissipative passive impedance load connected to said load output terminals, said load having such resistance-to-reactance ratio as to apply through said synchro means to said generating means output terminals an impedance having said selected resistance-to-reactance ratio.

4. A cyclic function modifying circuit comprising, means for generating a spatially multiphase signal representative of said cyclic function and presenting at its output terminals a selected resistance-to-reactance impedance ratio and a selected impedance value, mechanical means for controlling the space phase of the signal generated by said generating means, receiving circuit connected to said output terminals, a synchro control transformer having a two-pole magnetically smooth adjustably rotatable magnetic armature structure and coil, said synchro control transformer having spatially multiphase field coils, said field coils ebing connected to said output terminals, and an adjustable dissipative passive impedance load connected to said armature coil, said load having such resistance-to-reactance ratio of impedance as to apply through said synchro control transformer to said generating means output terminals an impedance having said selected resistance-to-reactance ratio, the mid value of said adjustable impedance load as applied to said output terminals being of the same order of magnitude as the said selected impedance value.

5. A cyclic function modifying circuit in accordance with claim 4 in which said adjustable dissipative passive impedance load is connected to said armature coil through a transformer of adjustable turn ratio whereby the impedance value imposed by the load on the armature coil may be adjusted.

6. A cyclic function modifying circuit in accordance with claim 5 in which said transformer is an auto-transformer having a tapped coil for adjustment of the impedance applied by the load on the armature coil while maintaining the resistance-to-reactance ratio of the applied load constant.

7. A cyclic function modifying circuit comprising, means for generating a spatially multiphase signal representative of said cyclic function, a synchro receiver having said signal impressed thereon, a second synchro having its input connected in parallel with the input of said first synchro, and a passive load connected to the output of said second synchro.

References Cited in the file of this patent

UNITED STATES PATENTS

| | | |
|---|---|---|
| 2,550,663 | Bechenberger et al. | May 1, 1951 |
| 2,581,436 | McCarthy | Jan. 8, 1952 |
| 2,651,010 | Wendt | Sept. 1, 1953 |
| 2,700,745 | Depp et al. | Jan. 25, 1955 |

FOREIGN PATENTS

| | | |
|---|---|---|
| 344,135 | Germany | Nov. 17, 1921 |